UNITED STATES PATENT OFFICE.

GEORGE W. MILES, OF SANDWICH, MASSACHUSETTS, ASSIGNOR TO ROSS CHEMICAL COMPANY, A CORPORATION OF MAINE.

METHOD OF OXIDIZING RESIN.

1,410,211. Specification of Letters Patent. Patented Mar. 21, 1922.

No Drawing. Application filed March 12, 1920. Serial No. 365,337.

*To all whom it may concern:*

Be it known that I, GEORGE W. MILES, a citizen of the United States, and resident of Sandwich, in the county of Barnstable and State of Massachusetts, have invented new and useful Improvements in Methods of Oxidizing Resin, of which the following is a specification.

My invention consists of a process of oxidizing resin, and has for its object the acceleration of oxidation and the production of more thorough oxidation than can with any certainty be accomplished by mere exposure of resin to the action of air. A use for oxidized resin is described in my application for United States Letters Patent, filed January 10, 1919, Serial No. 270,605, of which the accompanying specification and claims are a continuation in part; this use is in the production, by ammonia-saponification of an oxidized resin, of a resinate having the property of indefinite extensibility of dilution in water, thus adapted to use as a coating material.

Resins, for example ordinary rosin, even when finely powdered, oxidize but slowly in contact with air, so that even after weeks of such exposure the rosin is not completely or uniformly oxidized.

I believe that the retardation of oxidation of substances like rosin when merely exposed to air is due in part at least to the exhaustion of the oxygen in the air immediately in contact with the rosin, and the retention of the inert gases of the air as an adsorbed film upon the rosin, which is thus protected against the access of fresh oxygen. Agitation of powdered rosin does not serve to ensure thorough or thoroughly distributed oxidation, even after exposures to air for a long time. The problem has been solved in one way, by preliminary association of the rosin with a stimulator or promoter of oxidation which is not in itself an oxidizing agent, and subsequent exposure of the thus prepared rosin to the action of the air. This process is described in an application for patent filed by me concurrently herewith, serially numbered 365338.

I have discovered also, that if an oxidizing agent be brought into intimate contact with rosin in comminuted condition so that its specific surface is large, under conditions which preclude the formation of protective adsorbed films of inert gases, the oxidation of the rosin will be far more rapid and more uniformly distributed than is the case when rosin is oxidized merely by contact with air. For example, take rosin in finely powdered condition, and mix it with a water solution of hydrogen peroxid, preferably agitating to produce thorough contact between the rosin and the solution. The physical conditions preclude the existence of any obstacle to renewed contact and reaction between the oxidizing agent and the rosin, so that the rosin becomes uniformly and quite thoroughly oxidized in a relatively short time. If it be desired to produce an oxidized rosin which, when saponified with ammonia produces an ammonium resinate adapted to use as a coating-material (as set forth in my said application Serial No. 270,605) the oxidation of the rosin should be carried on until a sample of the rosin, with an equal weight of water and ammonia in quantity requisite to saponification, forms a clear and indefinitely extensible solution.

Rosin, when comminuted and thoroughly wet, as in a body of water, which precludes the formation of adsorbed films of gas, is oxidizable by other oxidizing agents which are susceptible of being brought into intimate contact with the rosin, as for instance ozone, which, introduced into the water and agitated with the powdered rosin, oxidizes the rosin rapidly and uniformly—as contrasted with oxidation by mere exposure to air. The product can be tested as above suggested.

I claim:

1. The method of oxidizing resin, which consists in subjecting resin in comminuted condition directly to an oxidizing agent in water.

2. The method of oxidizing resin which consists in subjecting resin in comminuted condition to the oxidizing action of hydrogen peroxid in water.

Signed by me at Boston, Massachusetts, this 11th day of March, 1920.

GEORGE W. MILES.